(12) United States Patent
Janssen et al.

(10) Patent No.: US 8,678,225 B2
(45) Date of Patent: Mar. 25, 2014

(54) USE OF A COMPOSITE MATERIAL AS A BARRIER UNDER CRYOGENIC CONDITIONS

(75) Inventors: Franciscus Antonius Henri Janssen, Amsterdam (NL); Levinus Marinus De Mul, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1273 days.

(21) Appl. No.: 12/517,718

(22) PCT Filed: Dec. 6, 2007

(86) PCT No.: PCT/EP2007/063410
§ 371 (c)(1),
(2), (4) Date: Jul. 29, 2009

(87) PCT Pub. No.: WO2008/068303
PCT Pub. Date: Jun. 12, 2008

(65) Prior Publication Data
US 2010/0078439 A1    Apr. 1, 2010

(30) Foreign Application Priority Data
Dec. 6, 2006  (EP) .................................... 06125501

(51) Int. Cl.
*F17C 1/02*    (2006.01)
*F17C 13/00*   (2006.01)

(52) U.S. Cl.
CPC ................. *F17C 13/001* (2013.01); *F17C 1/02* (2013.01)
USPC ........... 220/560.12; 220/560.07; 220/560.08; 220/592; 428/34.1

(58) Field of Classification Search
USPC ............ 220/560.04, 560.07, 560.08, 560.09, 220/560.12, 560.15; 428/34.1, 446, 688
See application file for complete search history.

(56) References Cited

U.S. PATENT DOCUMENTS

| | | | |
|---|---|---|---|
| 4,105,819 A | 8/1978 | Kotcharian | 428/213 |
| 4,378,403 A | 3/1983 | Kotcharian | 428/251 |
| 5,150,812 A * | 9/1992 | Adams | 220/589 |
| 5,419,139 A | 5/1995 | Blum et al. | 62/45.1 |
| 5,501,359 A | 3/1996 | Chauvin et al. | 220/452 |
| 6,460,721 B2 * | 10/2002 | Bowen et al. | 220/586 |
| 6,962,672 B2 | 11/2005 | Gauthier | 264/516 |

(Continued)

FOREIGN PATENT DOCUMENTS

| | | | |
|---|---|---|---|
| DE | 2608459 | 9/1976 | ............. B32B 15/08 |
| DE | 2720572 | 11/1978 | ................ F17C 3/02 |

(Continued)

OTHER PUBLICATIONS

Alcock, B., et al.: "The mechanical properties of woven tape all-polypropylene composites", Composites: Part A 38 (2007), pp. 147-161.

(Continued)

*Primary Examiner* — Robert J Hicks
*Assistant Examiner* — Kareen Rush

(57) ABSTRACT

The present invention relates to use of a composite material as a fluid barrier under cryogenic conditions, the composite material having: (a) a tensile Young's modulus of less than 50 GPa; and (b) a tensile strain at break of at least 5% at ambient conditions. The present invention further relates to a sandwich and a containment system for a cryogenic fluid comprising the composite material.

21 Claims, 5 Drawing Sheets

(56) References Cited

U.S. PATENT DOCUMENTS

| | | | |
|---|---|---|---|
| 7,037,865 B1 * | 5/2006 | Kimberly | 442/181 |
| 7,147,124 B2 * | 12/2006 | Minta et al. | 220/560.07 |
| 7,866,248 B2 * | 1/2011 | Moore et al. | 89/36.02 |
| 8,172,108 B2 * | 5/2012 | Emori et al. | 220/589 |
| 8,329,085 B2 * | 12/2012 | Kurtz et al. | 264/258 |
| 8,365,776 B2 * | 2/2013 | Salama et al. | 138/149 |
| 8,372,498 B2 * | 2/2013 | Cournoyer et al. | 428/36.9 |
| 2005/0064163 A1 | 3/2005 | Ward et al. | 428/292.1 |
| 2007/0181586 A1 | 8/2007 | Van Ootmarsum et al. | |

FOREIGN PATENT DOCUMENTS

| | | | |
|---|---|---|---|
| EP | 465252 | 1/1992 | F17C 1/16 |
| GB | 2025317 | 1/1980 | B32B 5/02 |
| JP | 52-103023 A | 8/1977 | |
| JP | 62-070021 | 3/1987 | |
| JP | 04-249699 A | 9/1992 | |
| JP | 2000-266282 A | 9/2000 | |
| JP | 2002-212320 A | 7/2002 | |
| WO | WO2006003192 | 1/2006 | F17C 3/02 |

OTHER PUBLICATIONS

Pegorettii, A., et al: "Flexural and interlaminar mechanical properties of unidirectional liquid crystalline single-polymer composites", Composites Science and Technology 66 (2006), pp. 1953-1962.

Alcock, B., et al.: "Interfacial Properties of Highly Oriented Coextruded Polypropylene Tapes for the Creation of Recyclable All-Polypropylene Composites", Journal of Applied Polymer Science, vol. 104, pp. 118-129 (2007).

Amantini, E., et al.: "The LNG Storage in Lined Rock Cavern", Gastech 2005.

* cited by examiner

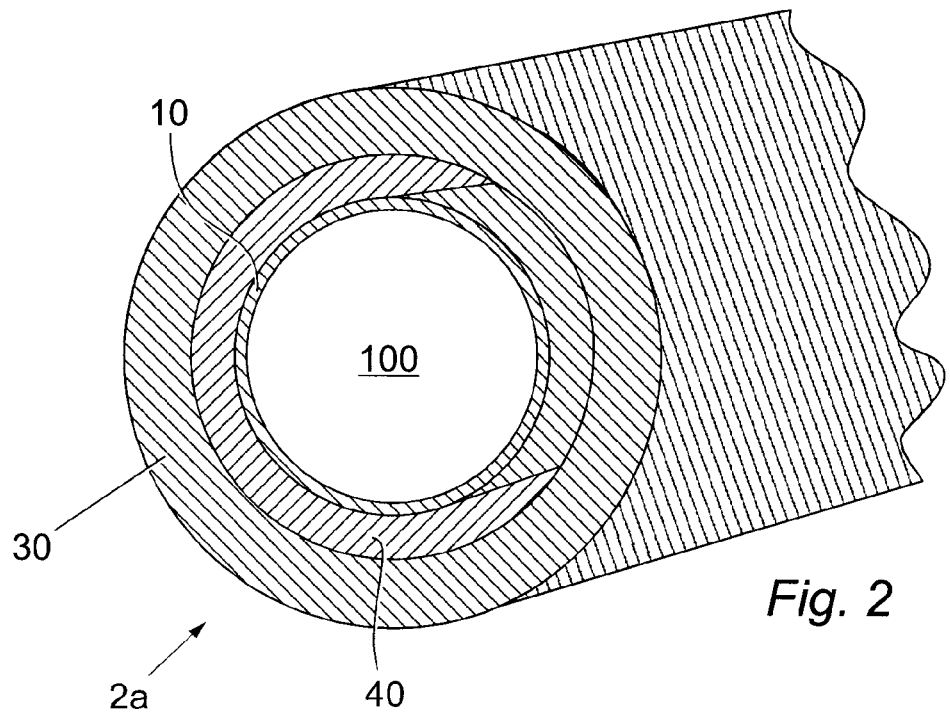
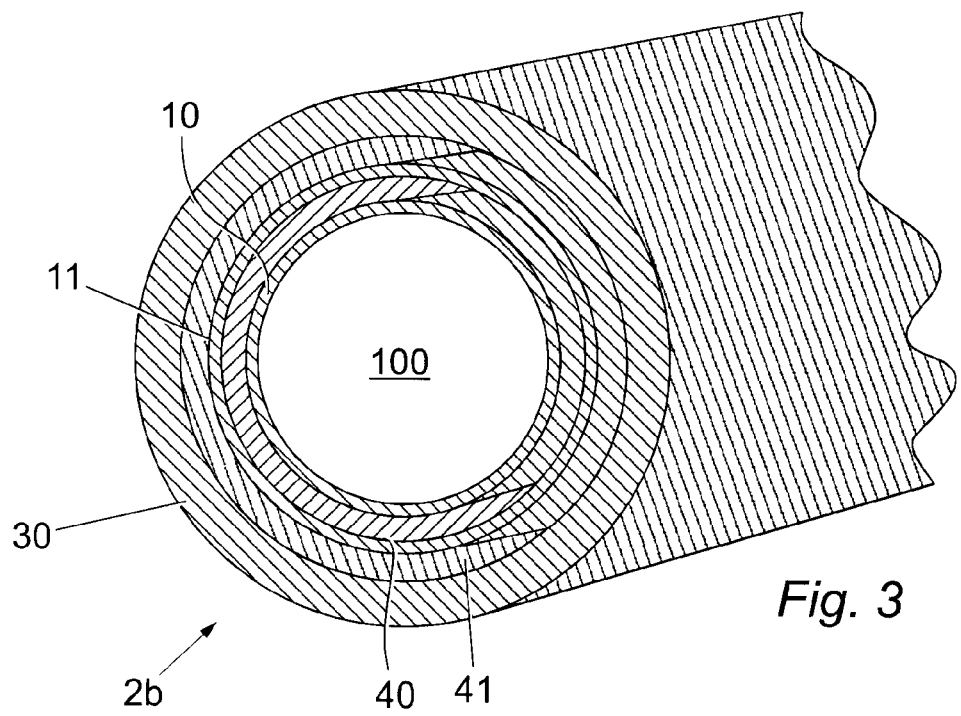

USE OF A COMPOSITE MATERIAL AS A BARRIER UNDER CRYOGENIC CONDITIONS

The present application claims priority from European Patent Application 06125501.4 filed 6 Dec. 2006.

FIELD OF THE INVENTION

The present invention relates to the use of a composite material as a barrier, in particular a fluid barrier, under cryogenic conditions, the composite material having certain properties. It also relates to a sandwich using the composite material, as well as containment systems such as containers, pipes, tanks, vessels, conduits and caverns, using the composite material.

BACKGROUND OF THE INVENTION

Fluid barriers for use under cryogenic conditions such as storage tanks and pipelines are intended to prevent the egress of the cryogenic fluid towards materials behind the barrier. Typically, conventional fluid barriers are based on special materials having similar properties such as nickel-steel or special fibre-reinforced composite materials. Examples of such special fibre-reinforced composite materials include those composed of thermosetting plastic matrix materials (such as epoxy and polyurethanes) reinforced by structural fibres such as graphite, glass, such as S2 glass and E glass, and Ultra High Molecular Weight polyethylene.

As an example, WO 2006/003192 A1 describes the use of a fluid barrier in a thermally insulated container for storing liquefied gas such as LNG (liquefied natural gas), liquefied nitrogen, oxygen or carbon dioxide and liquefied hydrogen. The fluid barrier as disclosed in WO 2006/003192 comprises a plastic material such as polyurethane or epoxy or a combination thereof. If desired, the fluid barrier may be reinforced by the incorporation of glass fibres.

Although the fluid barrier according to WO 2006/003192 A1 functions already satisfactorily, it has been found that the use of fluid barriers based on such composite materials may result in the introduction of high stresses that have to be accommodated by the overall construction. In some cases this may lead to mechanical failure of the fluid barrier and/or the overall construction.

EP 0 465 252 A1 describes a container or conduit for compressed and/or cryogenic gas comprising a gas impermeable synthetic polymer forming a gas barrier. Structural fibres can be embedded in the gas impermeable synthetic polymer to form a composite material. Typically, the composite material has a low strain and high modulus. When made using suitable structural fibres mentioned in the patent specification typically the composite materials will have Young's moduli of more than 50 GPa.

U.S. Pat. No. 6,962,672 describes a high pressure vessel particularly for a space engine. The internal skin of the pressure vessel may use a polyamide having a Young's modulus between 1 and 2 GPa. The tensile strain at break is not mentioned and, moreover, the internal skin is not a composite. Around the skin a reinforcing winding is wound, made from e.g. carbon fibre or aramide fibres sold under the name "Kevlar". These materials in the reinforcing winding have a very high Young's modulus.

It is an object of the present invention to minimize the above problem.

It is a further object to provide an alternative material for use as a fluid barrier, under cryogenic conditions, such as below −30° C., below −100° C., or even below −150° C.

It is a further object of the present invention to provide improved containment systems such as containers, pipes, tanks, vessels, conduits and caverns for cryogenic fluids.

SUMMARY OF THE INVENTION

One or more of the above or other objects may be achieved according to the present invention by providing the use of a composite material as a fluid barrier under cryogenic conditions, the composite material having:

(a) a tensile Young's modulus of less than 50 Gpa at ambient conditions; and (b) a tensile strain at break of at least 5% at ambient conditions.

BRIEF DESCRIPTION OF THE DRAWINGS

Embodiments of the present invention will be described and illustrated with reference to the following non-limiting drawings, which show:

FIGS. 2 to 4 schematically cross sectional views of three further pipes according to further embodiments of the present invention for transporting a cryogenic fluid such as LNG;

DETAILED DESCRIPTION OF THE INVENTION

Figure 1:
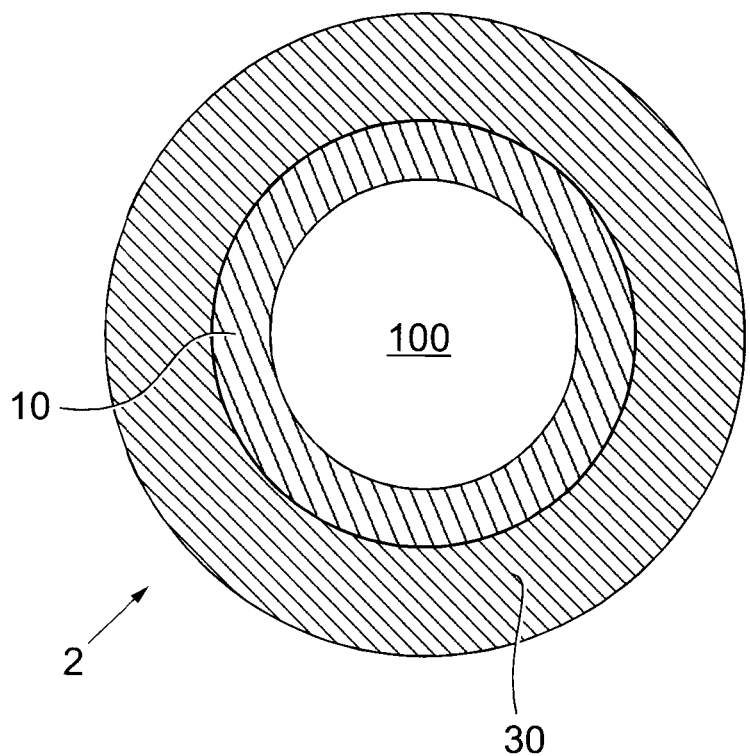
FIG. 1 schematically a cross-sectional view of a pipe according to the present invention for transporting a cryogenic fluid such as LNG.

Preferably, tensile Young's modulus is less than 40 GPa, and preferably above 1.0 GPa, more preferably above 2.0 Gpa.

Preferably, the tensile Young's modulus is determined according to DIN EN ISO 527 at ambient conditions, that is standard atmospheric conditions according to ISO 554, in particular the recommended atmospheric conditions i.e. at 23° C., 50% relative humidity and at a pressure between 86 and 106 kPa.

Preferably the tensile strain at break at ambient conditions is above 8%, more preferably above 10%, and even more preferably above 15%. Typically, the tensile strain at break at ambient conditions is not more than 75%.

The tensile strain at break is determined according to DIN EN ISO 527 at ambient conditions.

The stress of a material is related to its tensile Young's modulus and its coefficient of thermal expansion, and for cryogenic materials, it has hitherto been considered that low stress materials could not be used with cryogenic fluids due to the significant changes in temperatures experienced in use. However, the present invention has surprisingly found that the use of a composite material having a relatively low tensile Young's modulus is useable with cryogenic fluids. The use of such composite materials reduces the thermally induced stresses on the fluid barrier material as well as on any supporting structure, thereby enabling a wider range of materials to be selected for this supporting structure.

According to the present invention, a "composite material" is an engineered material made from two or more constituent materials with different physical or chemical properties and which remain separate and distinct on a macroscopic level within the finished structure. The tensile Young's modulus value of the composite material may depend on the relative amounts of the materials used. The person skilled in the art will readily understand how to vary the volume fractions of the various components of the composite material to tailor the desired properties.

In one embodiment of the present invention, the composite is a mono-material composite, i.e. a composite material formed from two layers comprising the same material, for example two layers of oriented thermoplastic material that are fused together at elevated temperature and pressure, thus forming thermoplastic matrix material interdispersed between and in the layers of oriented thermoplastic material. As is known by those skilled in the art, elevated pressure, in particular hydrostatic pressure, is important to control the melting temperature of the oriented thermoplastic material. Furthermore, in the mono-material composite material one or more additives may also be incorporated being chemically different.

In another embodiment of the present invention, the composite material is a plastic matrix material reinforced by a reinforcer, preferably where the reinforcer is at least partially incorporated into the plastic matrix material. The plastic matrix material may thus function as a continuous solid phase in which the reinforcer is embedded. There are no specific limitations with respect to the ratio of plastic matrix material and reinforcer.

The reinforcer may be in the form of chopped or continuous fibres, flakes or particles, but is preferably transformed into a material having a textile-like structure, such as felt, woven, roving, fabric, knit or stitched structure.

Further it is preferred that the reinforcer is selected from the group consisting of natural and thermoplastic materials or a combination thereof. The natural material may comprise fibres including vegetable fibres such as coir, cotton, linen, jute, flax, ramie, sisal and hemp; and animal fibres such as sheep wool, horse hair, and silk.

Preferably the reinforcer comprises a thermoplastic material. Preferably the thermoplastic material for the reinforcer comprises a polyolefin selected from the group consisting of polyethylene, polypropylene, polybutylene, polymethylpentene, polyisobutene or a copolymer or terpolymer thereof, preferably polypropylene.

The reinforcer can also be selected from a broad range of materials including carbon fibres, glass fibres, and polymeric fibres as long as the resulting composite material has a tensile Young's modulus of less than 50 Gpa and a tensile strain at break of at least 5%.

Preferably, the reinforcer has a tensile strain at break of at least 5% as determined according to DIN EN ISO 527 at ambient conditions, more preferably the tensile strain at break at ambient conditions is above 8%, even more preferably above 10%, and most preferably above 15%. Typically, the tensile strain at break at ambient conditions is not more than 75%.

The plastic matrix material to be used according to the present invention can be selected from a broad range of materials such as polymer materials including polyester, polycarbonate, vinyl ester, epoxy, phenolic, polyimide, polyamide and others, as long as the resulting composite material has a tensile Young's modulus of less than 50 GPa. However, it is preferred that the plastic matrix material has a tensile Young's modulus of 0.1-5.0 GPa as determined according to DIN EN ISO 527 at ambient conditions.

The plastic matrix material preferably includes a thermoplastic material or a thermoset material.

According to an especially preferred embodiment of the present invention the plastic matrix material is a thermoplastic material. An advantage of the thermoplastic material is that it can be easily shaped. Preferably, the thermoplastic material comprises a polyolefin selected from the group consisting of polyethylene, polypropylene, polybutylene, polymethylpentene, polyisobutene or a copolymer or terpolymer thereof, such as EPDM, preferably polypropylene.

The mono-material composite is preferably a thermoplastic material, in which both a oriented thermoplastic material, such as a reinforcing fibrous phase, and a matrix between the oriented thermoplastic material, comprises, preferably consists essentially of, more preferably consists of, the same thermoplastic polymer. Bonding is achieved due to controlled surface melting of the oriented thermoplastic material. The physical properties of the mono-material composite, such as tensile Young's modulus and coefficient of thermal expansion (CTE), can be controlled by the extent of melting effected in the process, which determines the oriented/not oriented thermoplastic material volumetric ratio, also referred to as the fibre/matrix ratio.

The way to manufacture these mono-material composites is known in the art and has for example been disclosed in US patent application publication No. 2005/0064163; B. Alcock et al. (2007), Journal of Applied Polymer Science, Vol. 104, 118-129; and B. Alcock et al. (2007), Composites: Part A (applied science and manufacturing), Vol. 38, 147-161, incorporated herein by reference.

The manufacturing process typically utilizes oriented thermoplastic polymer fibres in various forms: unidirectional lay-up, woven fabric or chopped fibres/non-woven felt. As is known in the art, it is important to control the fibres' melting temperature by hydrostatic pressure. The fibres are heated under elevated pressure to a temperature that is below their melting point at the elevated pressure but above the melting temperature at a lower pressure. Reduction of pressure for controlled time results in melting of the fibres, which starts at the fibre surface. This surface melting under controlled pressure followed by crystallization produces the consolidated structure.

An alternative known process involves the use of a special co extrusion of matrix material around oriented thermoplastic material strands, such as fibres. This process of co-extrusion and tape welding has advantages over the conventional sealing processes because of the large sealing window (130-180° C.) without loss of material properties.

Preferably, the mono-material composite comprises, more preferably consists essentially of, even more preferably consists of, a polyolefin selected from the group consisting of polyethylene, polypropylene, polybutylene, polymethylpentene, polyisobutene or a copolymer or terpolymer thereof, such as EPDM, more preferably polypropylene.

The composite material is to be used as a fluid barrier under cryogenic conditions, that is below −30° C., more preferably at temperatures below −100° C., or even below −150° C. Such a temperature (below −100° C., preferably below −150° C., typically, −160° C.) is suitable for liquefied natural gas (LNG).

For the purposes of this specification a cryogenic liquid is a liquefied gas that has been liquefied by lowering the temperature to cryogenic conditions. A cryogenic fluid includes a cryogenic liquid, a gas that is kept under cryogenic conditions and a supercritical fluid that is kept under cryogenic conditions. A fluid barrier is a barrier suitable for cryogenic fluids. Cryogenic conditions for the purposes of this specification mean temperatures less than −30° C., preferably less than −100° C., more preferably less than −150° C. The composite material is preferably used at temperatures less than −100° C., more preferably less than −150° C. because in that way the benefits of using composite materials with these properties are fully exploited.

Preferably, the composite material has a tensile strain at break of at least 3% as determined according to DIN EN ISO 527 at −196° C. (in liquid nitrogen), more preferably at least 5%, even more preferably at least 6%, even more preferably above 8%, even more preferably above 10%.

The composite material preferably has a coefficient of thermal expansion less than $250*10^{-6}$ m/m/° C. at 40° C. More preferably, the composite material is oriented and the composite material has a coefficient of thermal expansion less than $250*10^{-6}$ m/m/° C. at 40° C. in the direction of the orientation of the composite material.

Further, preferably, the composite material has a coefficient of thermal expansion less than $100*10^{-6}$ m/m/° C. at −60° C. More preferably, the composite material is oriented and the composite material has a coefficient of thermal expansion less than $100*10^{-6}$ m/m/° C. at −60° C. in the direction of the orientation of the composite material.

The coefficient of thermal expansion can suitably be determined according to ISO11359-2 in the temperature range between −60 and +70° C. by thermal mechanical analysis (TMA).

In another aspect, the present invention provides the use of the fluid barrier in the containment, storage, processing, transport or transfer of a cryogenic fluid, such as a liquefied gas, including but not limited to LNG, liquefied nitrogen, oxygen, carbon dioxide and hydrogen. Such use can be temporary or permanent, on-shore or off-shore, above ground, above water, under water or underground, or a combination thereof. Such uses can also be up-stream and/or downstream of other apparatus, devices, units or systems of any part of a plant or facility for containing, storing, processing, transporting and/or transferring a cryogenic fluid. This includes one or more of a liquefaction plant, an export, loading, transport, unloading, import or end-use facility, or a part thereof.

Such uses include but are not limited to the following applications;

Storage and transportation of cryogenic fluids (pure or blended) for the use at temperatures below −30° C., preferably at temperatures below −100° C., more preferably at temperatures below −150° C. including tanks (i.e. bulk storage) at export and import terminals, shipping, and transfer elements such as pipes and hoses;

the containment of cryogenic fluids in onshore and offshore tanks of any geometric shape including (vertical) cylindrical tanks, prismatic tanks, ellipsoidal tanks, and spherical tanks;

the onshore and offshore storage or transportation of cryogenic fluids in containers, portable containers, shop-fabricated containers, portable tanks and cargo tanks;

the underground storage including caverns such as rock caverns or underground containers, (examples of which are discussed in the article by Eric Amantini, Emmanuel Chanfreau and Ho-Yeong Kim entitled "The LNG storage in lined rock cavern" in Gastech (2005), incorporated herein by way of reference);

pressurized or non-pressurized vessels for the temporary or permanent storage of cryogenic fluids;

pressurized or non-pressurized vessels for the transport (on land, by sea or air by any means) of cryogenic fluids of any geometric shape including but not limited to (vertical) cylindrical, prismatic, ellipsoidal, spherical shapes);

flowing transport or transfer in flexible or rigid tubes including onshore and offshore, above water, in water or underwater, including pipes, pipe sections, pipelines, piping systems, hoses, risers and associated equipment and detailing.

The present invention also provides a containment system for a cryogenic fluid comprising at least one layer of a composite material as hereinbefore defined, the containment system preferably comprising one or more of the group comprising: a container, a tank, a pipe, a vessel, a conduit and a cavern.

Examples of such containment systems and their use are hereinbefore described. Pipes include pipelines or pipe sections, being continuous or in discrete lengths.

One particular example of a containment system is a container for storing a cryogenic fluid, the container at least comprising:
  a load bearing structural outer shell;
  on the inside of the outer shell one or more fluid barriers comprising a composite material as herein before defined.

Another particular example of a containment system is a pipe for transporting a cryogenic fluid, at least comprising:
  a load bearing structural outer shell, preferably from a plastic material;
  on the inside of the outer shell a fluid barrier comprising a composite material as hereinbefore defined, especially having a tensile Young's modulus of less than 50 GPa as determined according to DIN EN ISO 527 at atmospheric conditions.

In particular, such a pipe could comprise:
one or more concentric inner fluid barriers around a central fluid conduit;
an outer concentric layer: and optionally
at least one annulus between at least one inner fluid barrier and the outer concentric layer, said annulus or annuli (40) being filled with one or more thermal insulants.

Such a pipe could comprise two, three or four inner fluid barriers, with an annulus between each neighbouring set of two inner fluid barriers and between the outermost inner fluid barrier and the outer concentric layer, preferably at least two of the annuli being filled with two or more different thermal insulants.

Suitable thermal insulants are known in the art, and include various foams and gels, such as microgel or microtherm (a microporous mixture of ceramic powder and fibres).

In one embodiment of such a pipe, at least one inner fluid barrier is elongatable, preferably all inner fluid barriers are elongatable, so as to accommodate longitudinal change in the pipe due to a temperature change during the presence of a cryogenic fluid.

The present invention also provides a sandwich for use as a barrier, in particular a fluid barrier, under cryogenic conditions comprising a composite material as defined herein and a structural support layer. Such a sandwich may comprise any number of layers, generally two or three, and a containment system of the present invention may comprise one or more of such sandwiches having the same or different construction such as material and widths. Suitable widths for a sandwich of the present invention can range from 1-50 mm.

The present invention also provides a sandwich for use as a barrier, in particular a fluid barrier, under cryogenic conditions comprising a layer of an insulating material and a barrier comprising a composite material as hereinbefore defined. The insulating material is preferably one or more of the insulants mentioned herein.

The same reference numbers refer to similar structural elements.

Reference is now made to FIG. 1. FIG. 1 schematically shows a cross-sectional view of a pipe 2 for transporting cryogenic liquids such as LNG, LPG and liquid nitrogen. The pipe 2 comprises a load bearing outer shell 30, and a fluid barrier 10 on the inside of the load bearing outer shell 30, concentrically around a central fluid conduit 100.

The load bearing outer shell 30 may be made from a metallic material such as nickel steel or concrete, but is preferably made from a stiff plastic material such as carbon reinforced epoxy material or glass reinforced epoxy material.

The fluid barrier 10 is made from a composite material having a tensile Young's modulus of less than 50 GPa. An example of a suitable material for the fluid barrier 10 is a composite material composed of a polypropylene matrix material enforced with polypropylene fibres, i.e. a single-polymer composite material. Such a composite material can be obtained as such as e.g. Curv™ C100A (obtainable from Propex Fabrics, Gronau, Germany) and has a tensile Young's modulus of 3.2 GPa as determined according to DIN EN ISO 527 at ambient conditions.

Another example of a suitable composite material is a composite material composed of polypropylene fibres co-extruded with a polyethylene-polypropylene mixture. The co extruded material is molten to form the matrix for the composite, marketed under the tradename "PURE" (obtainable from Lankhorst Pure Composites B.V., Sneek, the Netherlands). Tensile Young's modulus at ambient conditions was about 6.4 GPa and the tensile strain at break was 10% for this composite material.

Other suitable composite materials have been described in A. Pegoretti et al., "Flexural and interlaminar mechanical properties of unidirectional liquid crystalline single-polymer composites", Composite Science and Technology 66 (2006), pp. 1953-1962, the content of which is hereby incorporated by reference.

Table I below lists a number of properties of the above-mentioned composite material Curv™ C100A.

TABLE I

| C Composite material | C CurvTM C100A | |
| --- | --- | --- |
| Tensile Young's modulus at ambient conditions | 3.2 ± 0.2 GPa | |
| Tensile Young's modulus at −196° C. | 12.0 ± 1.7 GPa | |
| Tensile strain at break at ambient conditions | 17.6% ± 0.6 | |
| Coefficient of Thermal Expansion in $10^{-6}$ m/m/° C. | In fibre direction | Perpendicular to fibre direction |
| Between −60 and −20° C. (below Tg) | 26 ± 4 | 52 ± 7 |
| Between 0 and 20° C. | 44 ± 7 | 79 ± 20 |
| Between 40 and 70° C. (above Tg) | 120 ± 61 | 125 ± 33 |

The coefficient of thermal expansion was determined according to ISO11359-2 in the temperature range between −60 and +70° C. by thermal mechanical analysis (TMA). Measurements were carried out in both the fibre direction and the direction perpendicular to the fibre direction. Other measurements were performed according to the methods set out herein above.

The person skilled in the art will understand that the pipe assembly 2 may, in addition to the outer shell 30 and fluid barrier 10, comprise further components such as further layers between the outer shell 30 and fluid barrier 10, outer coatings on the outer shell 30, etc.

One such example is shown in FIG. 2, which shows a pipe having, concentrically from a central fluid conduit 100, a first fluid barrier 10, a first annulus 40, and an outer concentric layer 30, generally being structurally supporting of the inner parts of the pipe 2a. The annulus 40 may be filled with one or more thermal insulants, generally foams or gels such as aerogels, microfoams, etc.

FIG. 3 shows a further example of a pipe 2b comprising, concentrically from a central fluid conduit 100, a first inner fluid barrier 10, a first annulus 40, a second fluid barrier 11, a second annulus 41, and then an outer concentric layer 30. The first and second fluid barriers 10, 11 may have the same or different composition, and the first or second annuli 40, 41 may comprise the same or different thermal insulants.

Figure 4:
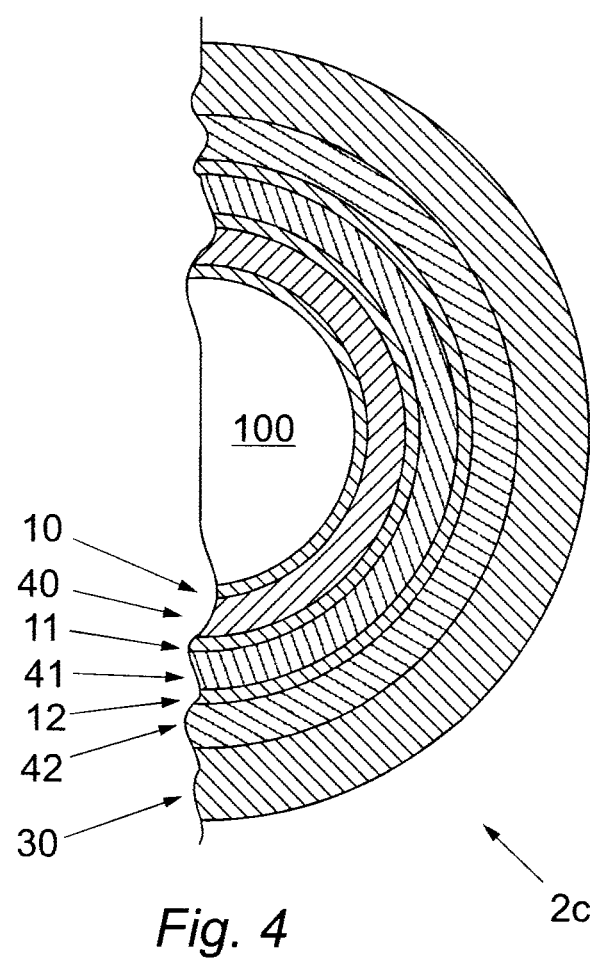

FIG. 4 shows another example of a pipe 2c concentrically comprising from a central fluid conduit 100, first, second and third fluid barriers 10, 11, 12, and an outer concentric layer 30, and first, second and third annuli 40, 41, 42, thereinbetween.

Typically, a pipe 2a such as exemplified in FIG. 2 concentrically at least comprises:

a central fluid conduit 100 having a diameter in the range 50-1500 mm, preferably 250-1000 mm, more preferably 500-900 mm;

a first inner fluid barrier 10 having a thickness in the range 1-10 mm;

a first annulus 40 having a thickness in the range 25-250 mm; and an outer concentric layer 30 having a thickness in the range 25-250 mm.

Figure 5:
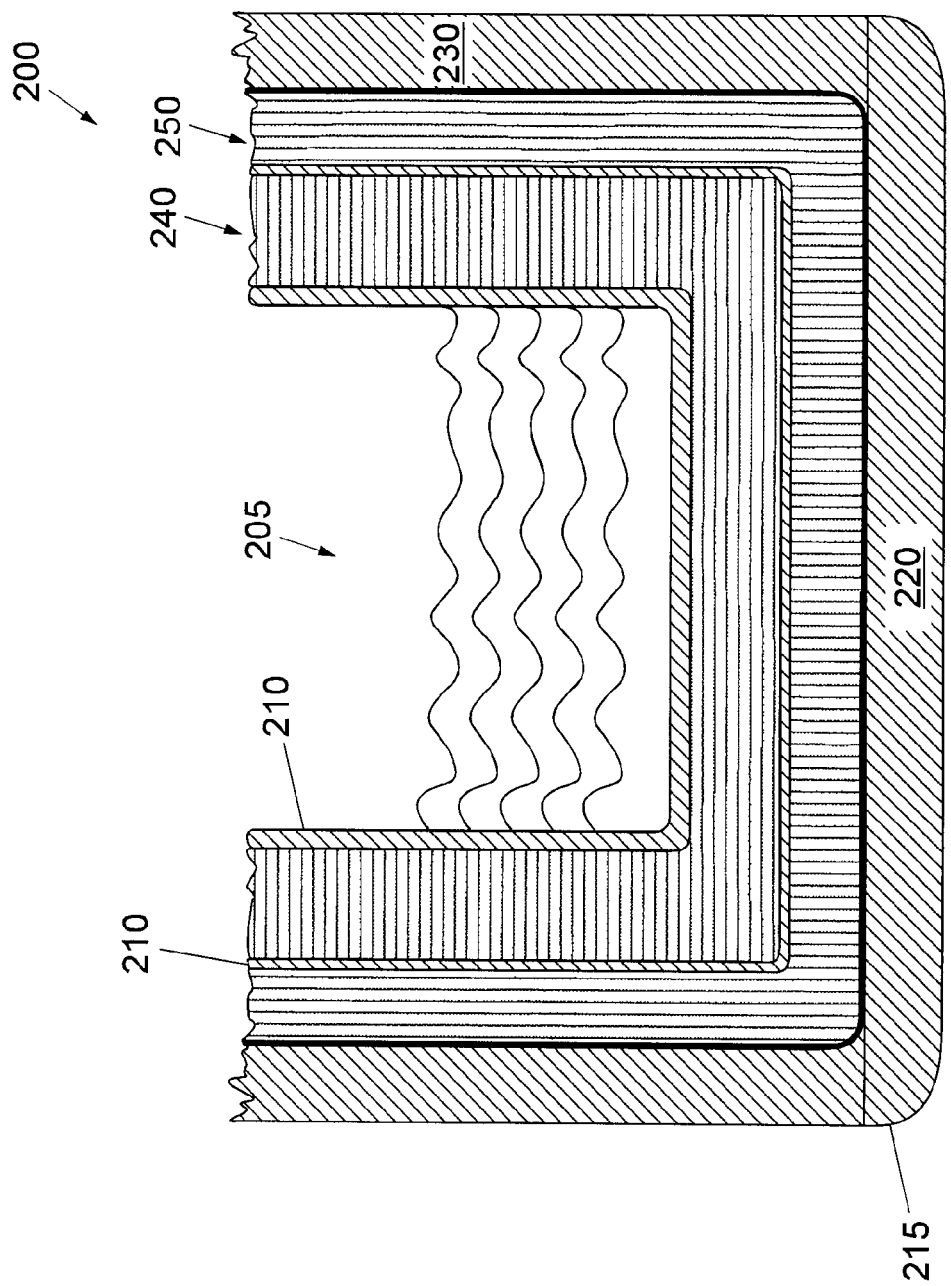
FIG. 5 schematically a cross-sectional view of a container for storing a cryogenic fluid.

FIG. 5 schematically shows a cross-sectional view of a thermally insulated container 200 for storing a cryogenic fluid. The container 200 comprises a load bearing structural outer shell 215 composed of a base plate 220 and a sidewall 230. In the embodiment of FIG. 5 the base plate 220 and the side wall 230 are made of concrete. For the sake of completeness it is observed that the container 200 includes a roof (not shown) that is insulated and can form a part of the structural outer shell 215.

The container 200 further includes at least two thermally insulating containment layers, i.e. an 'inner containment layer' 240 and an 'outer containment layer' 250, which are secured to the inner surface of the structural shell 215.

Each containment layer 240 and 250 includes panels of an insulating material (e.g. a foamed plastics material such as PVC or PUR).

Further the container 200 comprises two vapour- and liquid-tight fluid barriers 210, one being in contact with the liquefied gas 205 contained in the container 200, and one between the inner containment layer 240 and outer containment layer 250. The fluid barriers 210 are made from a composite material as defined herein, a suitable example of which is given in Table I above.

The fluid barriers 210, containment layers 240, 250 and outer shell 215 may be fixed to each other by any suitable means such as spraying, gluing, mechanical fixation, fusion welding etc., as is known in the art.

Figure 6:
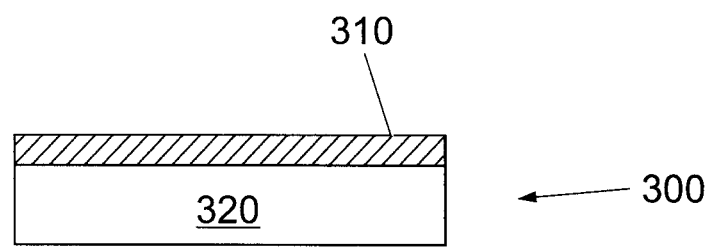
FIG. 6 schematically a cross-sectional view of a sandwich according to the present invention.

FIG. 6 schematically shows a cross-sectional view of a sandwich 300 according to the present invention, which may be used in a pipe assembly 2, 2a, 2b, 2c or a storage tank 200 as exemplified in the above FIGS. 1 to 5. The sandwich 300 comprises a layer 320 of a thermally insulating material such as PVC, PUR, etc., and a fluid barrier 310 made of the composite material defined herein. The fluid barrier 310 may be attached to the plate 310 by means of adhesive bonding, welding or melting or any other suitable means as is known in the art.

The person skilled in the art will readily understand that many modifications may be made without departing from the scope of the invention.

What is claimed is:

1. A composite material for use as a fluid barrier under cryogenic conditions, the composite material having: (a) a tensile Young's modulus of less than 50 GPa at ambient conditions; and (b) a tensile strain at break of at least 5% at ambient conditions; wherein the composite material comprises a mono-material composite or a plastic matrix material reinforced by a reinforcer.

2. A composite material as claimed in claim 1 having a coefficient of thermal expansion less than $250*10^{-6}$ m/m/° C. at 40° C.

3. A composite material as claimed in claim 1 having a tensile strain at break of at least 3% at −196° C.

4. A composite material as claimed in claim 1 having a coefficient of thermal expansion less than $100*10^{-6}$ m/m/° C. at −60° C.

5. A composite material as claimed in claim 1 wherein the mono-material composite is a thermoplastic material, in which both an oriented thermoplastic material and a matrix between the oriented thermoplastic material comprises the same thermoplastic polymer.

6. A composite material according to claim 1 comprising a plastic matrix material reinforced by a reinforcer, and the reinforcer has a tensile strain at break of at least 5%.

7. A composite material according to claim 1 for use in the containment, storage, processing, transport or transfer of a cryogenic fluid.

8. A sandwich for use as a barrier under cryogenic conditions comprising a composite material and a structural support layer, the composite material having (a) a tensile, Young's modulus of less than 50 GPa at ambient conditions; and (b) a tensile strain at break of at least 5% at ambient conditions, wherein the composite material comprises a mono-material composite or a plastic matrix material reinforced by a reinforcer.

9. A sandwich for use as a barrier under cryogenic conditions comprising a layer of an insulating material and a barrier comprising a composite material having (a) a tensile Young's modulus of less than 50 GPa at ambient conditions; and (b) a tensile strain at break of at least 5% at ambient conditions, Wherein the composite material comprises a mono-material composite or a plastic matrix material reinforced by a reinforcer.

10. A containment system for a cryogenic fluid comprising at least one layer of a composite material as a fluid barrier under cryogenic conditions, the composite material having: (a) a tensile Young's modulus of less than 50 GPa at ambient conditions; and (b) a tensile strain at break of at least 5% at ambient conditions; wherein the composite material comprises a mono-material composite or a plastic matrix material reinforced by a reinforcer.

11. A containment system as claimed in claim 10 being a container for storing a cryogenic fluid, the container at least comprising:
   a load bearing structural outer shell;
   on the inside of the outer shell, one or more fluid barriers comprising the composite material.

12. A containment system as claimed in claim 10 being a pipe for transporting a cryogenic fluid at least comprising:
   an outer concentric layer; and
   one or more concentric inner fluid barriers around a central fluid conduit, the or each inner fluid barrier comprising the composite material.

13. A containment system according to claim 12 comprising two, three or four inner fluid barriers, with an annulus between at least one neighboring set of two inner fluid barriers and/or between the outermost inner fluid barrier and the outer concentric layer.

14. A containment system according to claim 13 comprising two, three or four inner fluid barriers, with an annulus between each neighboring set of two inner fluid barriers and between the outermost inner fluid barrier and the outer concentric layer.

15. A composite material as claimed in claim 2 having a tensile strain at break of at least 3% at −196° C.

16. A containment system according to claim 12 comprising at least one annulus between at least one inner fluid barrier and the outer concentric layer, said at least one annulus being filled with one or more thermal insulants.

17. A containment system as claimed in claim 10 wherein the composite material has a coefficient of thermal expansion less than $250*10^{-6}$ m/m/° C. at 40° C.

18. A containment system as claimed in claim 10 wherein the composite material has a tensile strain at break of at least 3% at −196° C.

19. A containment system as claimed in claim 1.1 wherein the composite material has a coefficient of thermal expansion less than $100*10^{-6}$ m/m/° C. at −60° C.

20. A containment system as claimed in claim 10 wherein the mono-material composite is a thermoplastic material, in which both an oriented thermoplastic material and a matrix between the oriented thermoplastic material comprises the same thermoplastic polymer.

21. A containment system according to claim 10 wherein the composite material comprises a plastic matrix material reinforced by a reinforcer, and the reinforcer has a tensile strain at break of at least 5%.

* * * * *